US012620722B2

(12) United States Patent
Huang

(10) Patent No.: US 12,620,722 B2
(45) Date of Patent: May 5, 2026

(54) ANTENNA STRUCTURE

(71) Applicant: Wistron NeWeb Corp., Hsinchu (TW)

(72) Inventor: Wan-Ju Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 84 days.

(21) Appl. No.: 18/883,790

(22) Filed: Sep. 12, 2024

(65) Prior Publication Data

US 2026/0011926 A1 Jan. 8, 2026

(30) Foreign Application Priority Data

Jul. 3, 2024 (TW) ................................ 113124931

(51) Int. Cl.
*H01Q 13/26* (2006.01)
*H01Q 5/50* (2015.01)

(52) U.S. Cl.
CPC ............... *H01Q 13/26* (2013.01); *H01Q 5/50* (2015.01)

(58) Field of Classification Search
CPC ...... H01Q 9/045; H01Q 21/064; H01Q 9/065; H01Q 7/00; H01Q 13/10; H01Q 1/243; H01Q 5/357; H01Q 13/106; H01Q 21/0075; H01Q 9/16
See application file for complete search history.

(56) References Cited

U.S. PATENT DOCUMENTS

2024/0047864 A1* 2/2024 Chen ...................... H01Q 5/385

* cited by examiner

*Primary Examiner* — Monica C King
(74) *Attorney, Agent, or Firm* — McClure, Qualey & Rodack, LLP

(57) ABSTRACT

An antenna structure includes a feeding adjustment element, an asymmetrical radiation element, a first meandering radiation element, a second meandering radiation element, a connection radiation element, a first additional radiation element, a second additional radiation element, and a dielectric substrate. A closed loop structure is formed by the first meandering radiation element, the second meandering radiation element, and the connection radiation element. The first additional radiation element is coupled to the connection radiation element and the first meandering radiation element. A first open slot and a first closed slot are formed between the first meandering radiation element and the first additional radiation element. The second additional radiation element is coupled to the connection radiation element and the second meandering radiation element. A second open slot and a second closed slot are formed between the second meandering radiation element and the second additional radiation element.

20 Claims, 2 Drawing Sheets

ANTENNA STRUCTURE

CROSS REFERENCE TO RELATED APPLICATIONS

This application claims priority of Taiwan Patent Application No. 113124931 filed on Jul. 3, 2024, the entirety of which is incorporated by reference herein.

BACKGROUND OF THE INVENTION

Field of the Invention

The present disclosure relates to an antenna structure, in particular to a wideband antenna structure.

Description of the Related Art

With the development of mobile communication technology, mobile devices have become increasingly common in recent years. Common examples include laptops, mobile phones, multimedia players, and other multifunctional portable electronic devices. To meet user demands, mobile devices typically feature wireless communication capabilities. Some cover long-range wireless communication, such as mobile phones using 2G, 3G, and LTE (Long Term Evolution) systems and their corresponding frequency bands (700 MHz, 850 MHz, 900 MHz, 1800 MHz, 1900 MHz, 2100 MHz, 2300 MHz, and 2500 MHz). Others cover short-range wireless communication, such as Wi-Fi and Bluetooth systems using frequency bands at 2.4 GHz, 5.2 GHz, and 5.8 GHz.

Antennas are essential components in wireless communication. If the antenna used for signal reception or transmission has insufficient bandwidth, it can lead to reduced communication quality for mobile devices. Therefore, designing compact and wideband antenna components is an important task for antenna designers.

BRIEF SUMMARY OF THE INVENTION

In a preferred embodiment, the present disclosure provides an antenna structure, including a feeding adjustment element coupled to a first feeding point; an asymmetrical radiation element coupled to the feeding adjustment element; a first meandering radiation element coupled to a second feeding point; a second meandering radiation element coupled to the second feeding point; a connection radiation element coupled between the first meandering radiation element and the second meandering radiation element, forming a closed loop structure; a first additional radiation element coupled to the connection radiation element and further coupled to the first meandering radiation element, forming a first open slot and a first closed slot; a second additional radiation element coupled to the connection radiation element and further coupled to the second meandering radiation element, forming a second open slot and a second closed slot; and a dielectric substrate. The feeding adjustment element, the asymmetrical radiation element, the first meandering radiation element, the second meandering radiation element, the connection radiation element, the first additional radiation element, and the second additional radiation element are all disposed on the dielectric substrate.

In some embodiments, the feeding adjustment element is a variable-width strip.

In some embodiments, the feeding adjustment element is disposed between the first meandering radiation element and the second meandering radiation element.

In some embodiments, the asymmetrical radiation element includes a rectangular part, a tapered part, and an extension part. The tapered part is coupled between the rectangular part and the extension part.

In some embodiments, the extension part of the asymmetrical radiation element is closer to the first meandering radiation element than the second meandering radiation element.

In some embodiments, the first meandering radiation element further includes a first edge extension segment, and the second meandering radiation element further includes a second edge extension segment.

In some embodiments, the first meandering radiation element is inverted U-shaped for defining a first notch region.

In some embodiments, the first additional radiation element extends into the first notch region and is coupled to a first connection point on the first meandering radiation element.

In some embodiments, the second meandering radiation element is another inverted U-shape for defining a second notch region.

In some embodiments, the second additional radiation element extends into the second notch region and is coupled to a second connection point on the second meandering radiation element.

In some embodiments, the combination of the feeding adjustment element, the first meandering radiation element, the second meandering radiation element, the connection radiation element, the first additional radiation element, and the second additional radiation element forms a symmetrical pattern.

In some embodiments, the antenna structure covers a low-frequency band and a high-frequency band. The high-frequency band includes a specific frequency, a first frequency interval, a second frequency interval, and a third frequency interval.

In some embodiments, the low-frequency band is between 617 MHz and 960 MHz, and the high-frequency band is between 1450 MHz and 5925 MHz.

In some embodiments, the specific frequency is approximately 1700 MHz, the first frequency interval is between 2500 MHz and 2700 MHz, the second frequency interval is between 3300 MHz and 4200 MHz, and the third frequency interval is between 5150 MHz and 5925 MHz.

In some embodiments, the length of the closed loop structure is approximately equal to 0.25 times the wavelength of the lowest frequency of the low-frequency band.

In some embodiments, the length of the asymmetrical radiation element is approximately equal to 0.25 times the wavelength of the lowest frequency of the high-frequency band.

In some embodiments, the length of each of the first open slot and the second open slot is approximately equal to 0.25 times the wavelength of the center frequency of the first frequency interval.

In some embodiments, the length of each of the first closed slot and the second closed slot is approximately equal to 0.25 times the wavelength of the center frequency of the second frequency interval.

In some embodiments, the length of each of the first edge extension segment and the second edge extension segment is approximately equal to 0.25 times the wavelength of the center frequency of the third frequency interval.

In some embodiments, the distance between the rectangular part of the asymmetrical radiation element and the first or second meandering radiation element is approximately equal to 0.125 times the wavelength of the specific frequency.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
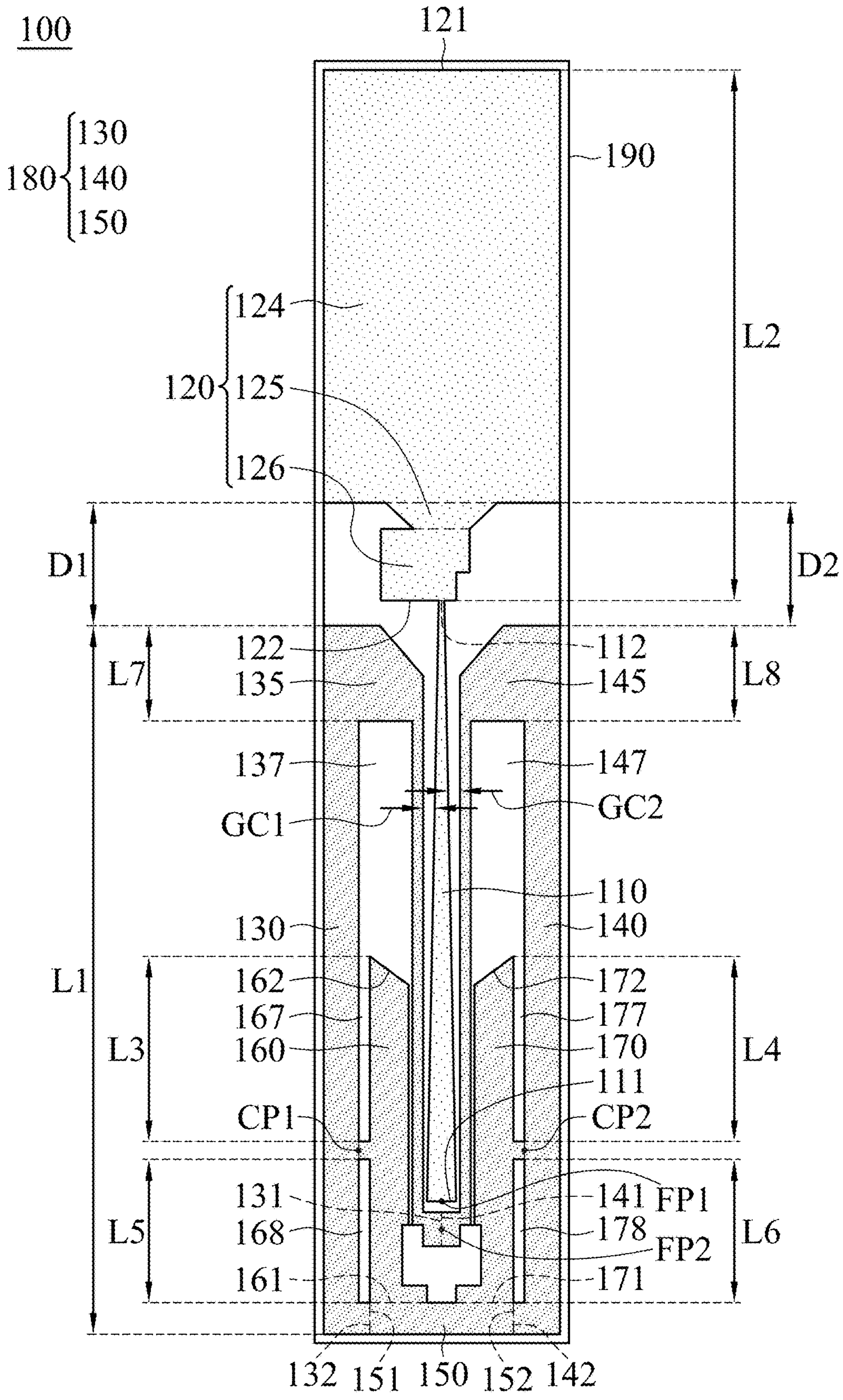
FIG. 1 is a top view showing an antenna structure according to an embodiment of the present disclosure.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view showing the antenna structure 100 according to an embodiment of the present disclosure. The antenna structure 100 can serve as an external antenna element and be applied to a communication device, such as a wireless access point, but is not limited thereto. As shown in FIG. 1, the antenna structure 100 includes a feeding adjustment element 110, an asymmetrical radiation element 120, a first meandering radiation element 130, a second meandering radiation element 140, a connection radiation element 150, a first additional radiation element 160, a second additional radiation element 170, and a dielectric substrate 190. The feeding adjustment element 110, the asymmetrical radiation element 120, the first meandering radiation element 130, the second meandering radiation element 140, the connection radiation element 150, the first additional radiation element 160, and the second additional radiation element 170 can all be made of metallic materials, such as copper, silver, aluminum, iron, or their alloys.

The feeding adjustment element 110 is disposed between the first meandering radiation element 130 and the second meandering radiation element 140. It should be noted that the feeding adjustment element 110 does not directly contact either the first meandering radiation element 130 or the second meandering radiation element 140. For example, a first coupling gap GC1 can be formed between the first meandering radiation element 130 and the feeding adjustment element 110, and a second coupling gap GC2 can be formed between the second meandering radiation element 140 and the feeding adjustment element 110. Specifically, the feeding adjustment element 110 has a first end 111 and a second end 112, and the first end 111 of the feeding adjustment element 110 is coupled to a first feeding point FP1. In some embodiments, the feeding adjustment element 110 may generally be in the form of a variable-width strip, with the width of its first end 111 being greater than the width of its second end 112, but not limited thereto.

The asymmetrical radiation element 120 has a first end 121 and a second end 122. The first end 121 of the asymmetrical radiation element 120 is an open end, and the second end 122 of the asymmetrical radiation element 120 is coupled to the second end 112 of the feeding adjustment element 110. In some embodiments, the asymmetrical radiation element 120 includes a rectangular part 124 located at the first end 121, a tapered part 125, and an extension part 126 located at the second end 122. The tapered part 125 is coupled between the rectangular part 124 and the extension part 126. Additionally, the extension part 126 of the asymmetrical radiation element 120 may be closer to the first meandering radiation element 130 than the second meandering radiation element 140. It should be noted that in this description, the term "adjacent" can refer to a distance between two corresponding elements being less than a predetermined distance (e.g., 10 mm or shorter), but usually does not include situations where the two corresponding elements are in direct contact with each other (i.e., the aforementioned distance is reduced to 0).

The first meandering radiation element 130 has a first end 131 and a second end 132. The first end 131 of the first meandering radiation element 130 is coupled to a second feeding point FP2. For example, the first feeding point FP1 can be further coupled to a positive electrode of a signal source (reference is omitted), and the second feeding point FP2 can be further coupled to a negative electrode of the signal source, in which the aforementioned signal source can be a radio frequency (RF) module used to excite the antenna structure 100. In some embodiments, the first meandering radiation element 130 further includes a first edge extension segment 135, which is adjacent to the extension part 126 of the asymmetrical radiation element 120. In some embodiments, the first meandering radiation element 130 may generally be inverted U-shaped for defining a first notch region 137, but not limited thereto.

The second meandering radiation element 140 has a first end 141 and a second end 142. The first end 141 of the second meandering radiation element 140 is coupled to the second feeding point FP2. In some embodiments, the second meandering radiation element 140 further includes a second edge extension segment 145. The second edge extension segment 145 is further away from the extension part 126 of the asymmetrical radiation element 120 than the first edge extension segment 135. In some embodiments, the second meandering radiation element 140 may generally be inverted U-shaped for defining a second notch region 147, but not limited thereto.

The connection radiation element 150 has a first end 151 and a second end 152. The first end 151 of the connection radiation element 150 is coupled to the second end 132 of the first meandering radiation element 130, and the second end 152 of the connection radiation element 150 is coupled to the second end 142 of the second meandering radiation element 140. That is, the connection radiation element 150 is coupled between the first meandering radiation element 130 and the second meandering radiation element 140. It should be noted that the first meandering radiation element 130, the second meandering radiation element 140, and the connection radiation element 150 can together form a closed loop structure 180. In some embodiments, the connection radiation element 150 may generally be in the form of a uniform-width strip, but not limited thereto.

The first additional radiation element 160 has a first end 161 and a second end 162. The first end 161 of the first additional radiation element 160 is coupled to the first end 151 of the connection radiation element 150. The second end 162 of the first additional radiation element 160 may be a triangular open end. In some embodiments, the first additional radiation element 160 may extend into the first notch region 137 and further be coupled to a first connection point CP1 on the first meandering radiation element 130, such that a first open slot 167 and a first closed slot 168 are formed between the first meandering radiation element 130 and the first additional radiation element 160. For example, the first open slot 167 may be in communication with the first notch region 137, but the first closed slot 168 may be completely independent of the first open slot 167. In some embodiments, the first additional radiation element 160 may generally be in the form of a variable-width strip, which may be generally perpendicular to the connection radiation element 150, but not limited thereto.

The second additional radiation element 170 has a first end 171 and a second end 172. The first end 171 of the second additional radiation element 170 is coupled to the second end 152 of the connection radiation element 150. The second end 172 of the second additional radiation element 170 may be another triangular open end. In some embodiments, the second additional radiation element 170 may extend into the second notch region 147 and further be coupled to a second connection point CP2 on the second meandering radiation element 140, such that a second open slot 177 and a second closed slot 178 are formed between the second meandering radiation element 140 and the second additional radiation element 170. For example, the second open slot 177 may be in communication with the second notch region 147, but the second closed slot 178 may be completely independent of the second open slot 177. In some embodiments, the second additional radiation element 170 may generally be in the form of another variable-width strip, which may also be generally perpendicular to the connection radiation element 150, but not limited thereto. Additionally, both the first additional radiation element 160 and the second additional radiation element 170 may be completely enclosed by the aforementioned closed loop structure 180.

In some embodiments, the combination of the feeding adjustment element 110, the first meandering radiation element 130, the second meandering radiation element 140, the connection radiation element 150, the first additional radiation element 160, and the second additional radiation element 170 may form a symmetrical pattern. In other words, the upper part of the antenna structure 100 may belong to an asymmetrical design, but the lower part of the antenna structure 100 may belong to a symmetrical design, thereby improving the overall impedance matching of the antenna structure 100.

The feeding adjustment element 110, the asymmetrical radiation element 120, the first meandering radiation element 130, the second meandering radiation element 140, the connection radiation element 150, the first additional radiation element 160, and the second additional radiation element 170 can all be disposed on the same surface of the dielectric substrate 190. For example, the dielectric substrate 190 can be implemented by an Flame Retardant (FR4) substrate, a printed circuit board (PCB), or a flexible printed circuit (FPC), but not limited thereto.

Figure 2:
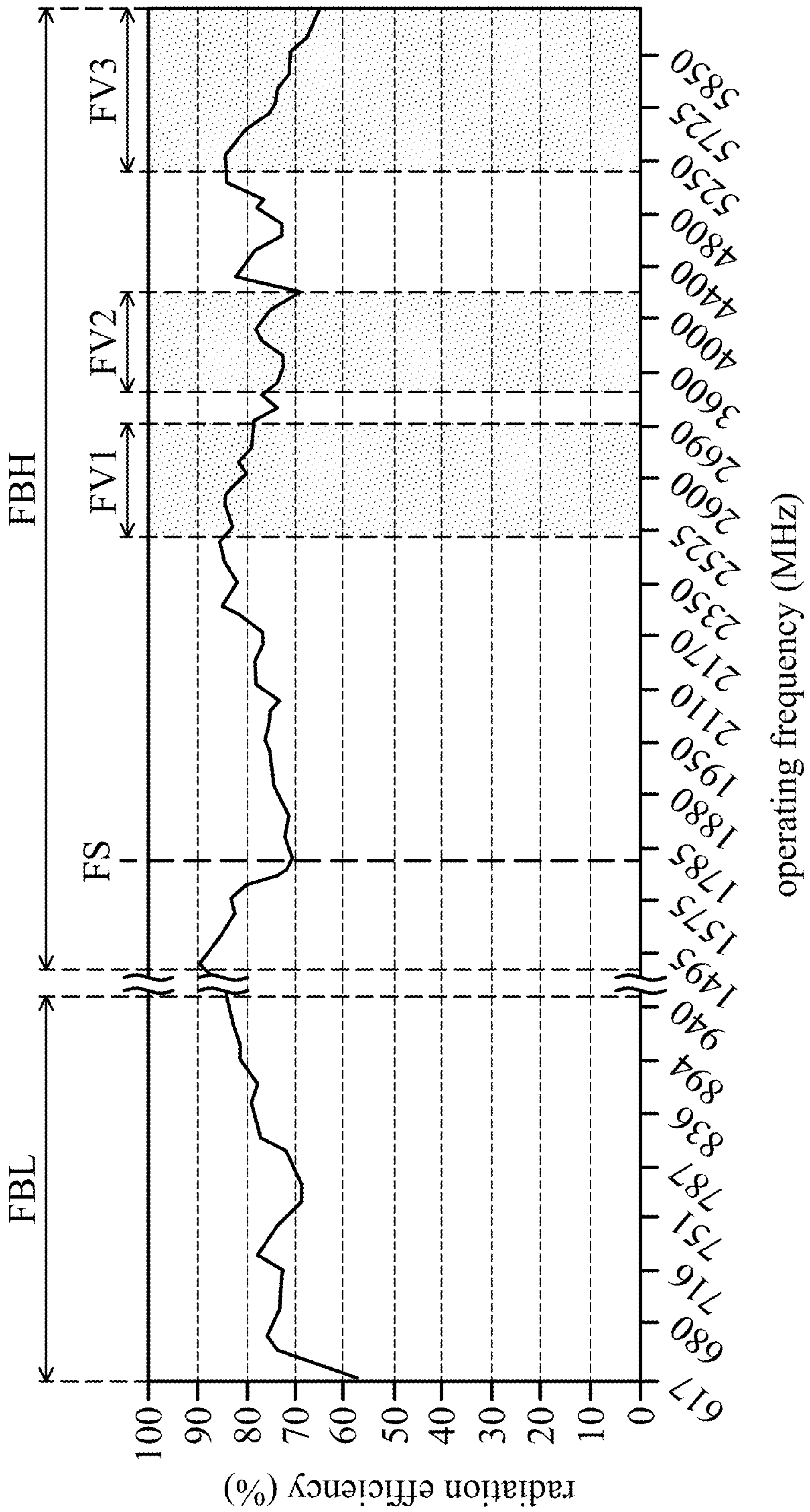
FIG. 2 is a radiation efficiency diagram of the antenna structure according to an embodiment of the present disclosure.

FIG. 2 is a radiation efficiency diagram of the antenna structure 100 according to an embodiment of the present disclosure, where the horizontal axis represents the operating frequency (MHz) and the vertical axis represents the radiation efficiency (%). According to the measurement results shown in FIG. 2, the antenna structure 100 can cover a low-frequency band FBL and a high-frequency band FBH. For example, the low-frequency band FBL can range from 617 MHz to 960 MHz, while the high-frequency band FBH can range from 1450 MHz to 5925 MHz. Therefore, the antenna structure 100 can at least support broadband operation in the sub-6 GHz band of the new generation 5G (5th Generation Mobile Networks). It should be noted that the radiation efficiency of the antenna structure 100 in both the low-frequency band FBL and the high-frequency band FBH can reach at least 60%, which can meet the practical application needs of general communication devices.

Specifically, the high-frequency band FBH includes a specific frequency FS, a first frequency interval FV1, a second frequency interval FV2, and a third frequency interval FV3. For example, the specific frequency FS can be approximately 1700 MHz, the first frequency interval FV1 can be between 2500 MHz and 2700 MHz, the second frequency interval FV2 can be between 3300 MHz and 4200 MHz, and the third frequency interval FV3 can be between 5150 MHz and 5925 MHz.

In some embodiments, the operating principle of the antenna structure 100 can be described as follows. The closed loop structure 180 is mainly used to excite the low-frequency band FBL. The feeding adjustment element 110, the asymmetrical radiation element 120, the first meandering radiation element 130, the second meandering radiation element 140, the connection radiation element 150, the first additional radiation element 160, and the second additional radiation element 170 can collectively excite the high-frequency band FBH. The first open slot 167 and the second open slot 177 can be used to fine-tune the impedance matching of the first frequency interval FV1. The first closed slot 168 and the second closed slot 178 can be used to fine-tune the impedance matching of the second frequency interval FV2. Additionally, the first edge extension segment 135 and the second edge extension segment 145 can be used to fine-tune the impedance matching of the third frequency interval FV3. According to actual measurement results, the inclusion of the first connection point CP1 and the second connection point CP2 helps increase the operational bandwidth of the antenna structure 100. It should be understood that since the antenna structure 100 belongs to a planar antenna, its overall manufacturing cost can be further reduced.

In some embodiments, the component dimensions of the antenna structure 100 can be described as follows. The length L1 of the closed loop structure 180 can be approximately equal to 0.25 times the wavelength (λ/4) of the lowest frequency of the low-frequency band FBL of the antenna structure 100. The length L2 of the asymmetrical radiation element 120 can be approximately equal to 0.25 times the wavelength (λ/4) of the lowest frequency of the high-frequency band FBH of the antenna structure 100. The length L3 of the first open slot 167 can be approximately equal to 0.25 times the wavelength (λ/4) of the center frequency of the first frequency interval FV1 of the high-frequency band FBH of the antenna structure 100. The length L4 of the second open slot 177 can be approximately equal to 0.25 times the wavelength (λ/4) of the center frequency of the first frequency interval FV1 of the high-frequency band FBH of the antenna structure 100. The length L5 of the first closed slot 168 can be approximately equal to 0.25 times the wavelength (λ/4) of the center frequency of the second frequency interval FV2 of the high-frequency band FBH of the antenna structure 100. The length L6 of the second closed slot 178 can be approximately equal to 0.25 times the wavelength (λ/4) of the center frequency of the second frequency interval FV2 of the high-frequency band FBH of the antenna structure 100. The length L7 of the first edge extension segment 135 can be approximately equal to 0.25 times the wavelength (λ/4) of the center frequency of the third frequency interval FV3 of the high-frequency band FBH of the antenna structure 100. The length L8 of the second edge extension segment 145 can be approximately equal to 0.25 times the wavelength (λ/4) of the center frequency of the third frequency interval FV3 of the high-frequency band FBH of the antenna structure 100. The distance D1 between the rectangular part 124 of the asymmetrical radiation element 120 and the first meandering radiation element 130 can be approximately equal to 0.125 times the wavelength (λ/8) of the specific frequency FS of the high-frequency band FBH of the antenna structure 100. The distance D2 between the rectangular part 124 of the asymmetrical radiation element 120 and the second meandering radiation element 140 can be approximately equal to 0.125 times the wavelength (λ/8) of the specific frequency FS of the high-frequency band FBH of the antenna structure 100. The width of the first coupling gap GC1 can be less than or equal to 2 mm. The width of the second coupling gap GC2 can be less than or equal to 2 mm. The dielectric substrate 190 can be generally rectangular, with a length ranging from 110 mm to 120 mm and a width ranging from 20 mm to 25 mm. These dimension ranges are derived from multiple experimental results and help optimize the radiation efficiency, impedance matching, and operational bandwidth of the antenna structure 100.

The present disclosure proposes a novel antenna structure that includes at least one closed loop structure. Compared with traditional designs, the present disclosure has advantages of small size, wide bandwidth, low manufacturing cost, and high radiation efficiency, making it well-suited for application in various communication devices.

It is worth noting that the component dimensions, component shapes, and frequency ranges described above are not limiting conditions of the present disclosure. Antenna designers can adjust these settings according to different needs. The antenna structure of the present disclosure is not limited to the states illustrated in FIGS. 1 and 2. The present disclosure can include any one or multiple features of any one or multiple embodiments illustrated in FIGS. 1 and 2. In other words, not all illustrated features need to be simultaneously implemented in the antenna structure of the present disclosure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a feeding adjustment element coupled to a first feeding point;

an asymmetrical radiation element coupled to the feeding adjustment element;

a first meandering radiation element coupled to a second feeding point;

a second meandering radiation element coupled to the second feeding point;

a connection radiation element coupled between the first meandering radiation element and the second meandering radiation element, wherein the first meandering radiation element, the second meandering radiation element, and the connection radiation element collectively form a closed loop structure;

a first additional radiation element coupled to the connection radiation element, wherein the first additional radiation element is further coupled to the first meandering radiation element, forming a first open slot and a first closed slot between the first meandering radiation element and the first additional radiation element;

a second additional radiation element coupled to the connection radiation element, wherein the second additional radiation element is further coupled to the second meandering radiation element, forming a second open slot and a second closed slot between the second meandering radiation element and the second additional radiation element; and a dielectric substrate, wherein the feeding adjustment element, the asymmetrical radiation element, the first meandering radiation element, the second meandering radiation element, the connection radiation element, the first additional radiation element, and the second additional radiation element are disposed on the dielectric substrate.

2. The antenna structure according to claim 1, wherein the feeding adjustment element is in the form of a variable-width strip.

3. The antenna structure according to claim 1, wherein the feeding adjustment element is disposed between the first meandering radiation element and the second meandering radiation element.

4. The antenna structure according to claim 1, wherein the asymmetrical radiation element comprises a rectangular part, a tapered part, and an extension part, and the tapered part is coupled between the rectangular part and the extension part.

5. The antenna structure according to claim 4, wherein the extension part of the asymmetrical radiation element is closer to the first meandering radiation element than the second meandering radiation element.

6. The antenna structure according to claim 4, wherein the first meandering radiation element further comprises a first edge extension segment, and the second meandering radiation element further comprises a second edge extension segment.

7. The antenna structure according to claim 1, wherein the first meandering radiation element is inverted U-shaped for defining a first notch region.

8. The antenna structure according to claim 7, wherein the first additional radiation element extends into the first notch region and is coupled to a first connection point on the first meandering radiation element.

9. The antenna structure according to claim 1, wherein the second meandering radiation element is another inverted U-shape for defining a second notch region.

10. The antenna structure according to claim 9, wherein the second additional radiation element extends into the second notch region and is coupled to a second connection point on the second meandering radiation element.

11. The antenna structure according to claim 1, wherein the combination of the feeding adjustment element, the first meandering radiation element, the second meandering radiation element, the connection radiation element, the first additional radiation element, and the second additional radiation element forms a symmetrical pattern.

12. The antenna structure according to claim 6, wherein the antenna structure covers a low-frequency band and a high-frequency band, and the high-frequency band comprises a specific frequency, a first frequency interval, a second frequency interval, and a third frequency interval.

13. The antenna structure according to claim 12, wherein the low-frequency band ranges from 617 MHz to 960 MHz, and the high-frequency band ranges from 1450 MHz to 5925 MHz.

14. The antenna structure according to claim 12, wherein the specific frequency is approximately 1700 MHz, the first frequency interval ranges from 2500 MHz to 2700 MHZ, the second frequency interval ranges from 3300 MHz to 4200 MHz, and the third frequency interval ranges from 5150 MHz to 5925 MHz.

15. The antenna structure according to claim 12, wherein the length of the closed loop structure is approximately equal to 0.25 times the wavelength of the lowest frequency of the low-frequency band.

16. The antenna structure according to claim 12, wherein the length of the asymmetrical radiation element is approximately equal to 0.25 times the wavelength of the lowest frequency of the high-frequency band.

17. The antenna structure according to claim 12, wherein the length of each of the first open slot and the second open slot is approximately equal to 0.25 times the wavelength of the center frequency of the first frequency interval.

18. The antenna structure according to claim 12, wherein the length of each of the first closed slot and the second closed slot is approximately equal to 0.25 times the wavelength of the center frequency of the second frequency interval.

19. The antenna structure according to claim 12, wherein the length of each of the first edge extension segment and the second edge extension segment is approximately equal to 0.25 times the wavelength of the center frequency of the third frequency interval.

20. The antenna structure according to claim 12, wherein the distance between the rectangular part of the asymmetrical radiation element and the first meandering radiation element or the second meandering radiation element is approximately equal to 0.125 times the wavelength of the specific frequency.

* * * * *